(12) United States Patent
Choi et al.

(10) Patent No.: US 8,340,032 B2
(45) Date of Patent: Dec. 25, 2012

(54) METHOD OF RETRANSMITTING DATA IN A WIRELESS COMMUNICATION SYSTEM AND APPARATUS FOR IMPLEMENTING THE SAME

(75) Inventors: Jin Soo Choi, Anyang-si (KR); Min Seok Oh, Anyang-si (KR); Hyung Ho Park, Anyang-si (KR); Sung Ho Moon, Anyang-si (KR); Jae Hoon Chung, Anyang-si (KR); Doo Hyun Sung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 582 days.

(21) Appl. No.: 12/525,259

(22) PCT Filed: Jan. 17, 2008

(86) PCT No.: PCT/KR2008/000290
§ 371 (c)(1),
(2), (4) Date: Jul. 30, 2009

(87) PCT Pub. No.: WO2008/093944
PCT Pub. Date: Aug. 7, 2008

(65) Prior Publication Data
US 2010/0002644 A1    Jan. 7, 2010

(30) Foreign Application Priority Data

Jan. 30, 2007    (KR) .................. 10-2007-0009376

(51) Int. Cl.
*H04B 7/005*    (2006.01)
*H04W 4/00*    (2009.01)
(52) U.S. Cl. .................. 370/329; 370/328; 370/278
(58) Field of Classification Search .................. None
See application file for complete search history.

(56) References Cited

U.S. PATENT DOCUMENTS

2002/0172307 A1*  11/2002  Sandberg .............. 375/344
2003/0235160 A1   12/2003  Saifuddin
(Continued)

FOREIGN PATENT DOCUMENTS

JP    2000-209145 A    7/2000
(Continued)

OTHER PUBLICATIONS

Liang et al., "A Statistical Power Allocation Strategy for Vector Block-Fading Channels", 15th International Symposium on Personal, Indoor and Mobile Radio Communications, vol. 1, Sep. 5-8, 2004, pp. 63-67.

Zhou et al., "Quantifying the Performance Gain of Direction Feedback in a MISO System" 40th Annual Conference on Information Sciences and Systems Chapter 11, Mar. 22-24, 2006, pp. 573-578.

(Continued)

*Primary Examiner* — Faruk Hamza
*Assistant Examiner* — Diane Lo
(74) *Attorney, Agent, or Firm* — Birch, Stewart, Kolasch & Birch, LLP

(57) ABSTRACT

A method of transmitting data in a wireless communication system is disclosed. More specifically, the method includes receiving a first group index and a second group index, wherein the first group index represents indices of a group having channel power below a specified threshold value and the second index group index represents indices of a group having channel power greater than or equal to the specified threshold value, and transmitting the data after swapping mapping locations of the first group index and the second group index.

16 Claims, 12 Drawing Sheets

U.S. PATENT DOCUMENTS

| | | | |
|---|---|---|---|
| 2004/0082356 A1 | 4/2004 | Walton et al. | |
| 2006/0109923 A1* | 5/2006 | Cai et al. | 375/260 |
| 2007/0153928 A1* | 7/2007 | Liu et al. | 375/260 |
| 2008/0056181 A1 | 3/2008 | Imamura et al. | |
| 2008/0123583 A1 | 5/2008 | Shiizaki et al. | |

FOREIGN PATENT DOCUMENTS

| | | |
|---|---|---|
| JP | 2000-224140 A | 8/2000 |
| JP | 2004-40232 A | 2/2004 |
| JP | 2004-274220 A | 9/2004 |
| JP | 2005-51824 A | 2/2005 |
| JP | 2005-269670 A | 9/2005 |
| WO | WO-02/43273 A2 | 5/2002 |
| WO | WO 2006/030867 A1 | 3/2006 |
| WO | WO 2006/070465 A1 | 7/2006 |
| WO | WO 2006/098105 A1 | 9/2006 |

OTHER PUBLICATIONS

Han et al., "Channel Estimation for OFDM with Fast Fading Channels by Modified Kalman Filter", IEEE Transactions on Consumer Electronics, vol. 50, No. 2, May 2004, pp. 443-449.

Koike et al., "Study on ARQ Throughput Performance of Space-Time Transmission Systems", The Institute of Electronics, Information and Communication Engineers, vol. 102, No. 549, Jan. 15, 2003, pp. 125-130, ISSN: 0913-5685.

Yoshii et al., "Hybrid ARQ Technique using antenna rotation and TPA", The Institute of Electronics, Information, and Communication Engineers, vol. 102, No. 675, Mar. 6, 2003, pp. 12-16, ISSN: 0913-5685.

* cited by examiner

No Effect

METHOD OF RETRANSMITTING DATA IN A WIRELESS COMMUNICATION SYSTEM AND APPARATUS FOR IMPLEMENTING THE SAME

TECHNICAL FIELD

The present invention relates to a method of transmitting data, and more particularly, to a method of transmitting data is a wireless communication system and an apparatus for implementing the same.

BACKGROUND ART

With fast growing use and popularity of multimedia and communication services, demand for faster and more reliable wireless communication services is also increasing at a fast rate. In order to accommodate such changing demands, the capacity of the wireless communication system needs to improve as well. To this end, the capacity can be improved by better utilizing and increasing the efficiency of the existing limited wireless resources.

As an example of improving the use of the existing limited wireless resources, a transmitter and a receiver can respectively be equipped with more than one antenna. With more than one antenna, diversity gain can be achieved with respect to spatial domain, and transmit diversity can be increased by transmitting data via each antenna in parallel.

DISCLOSURE OF THE INVENTION

Accordingly, the present invention is directed to a method of transmitting data is a wireless communication system and an apparatus for implementing the same that substantially obviates one or more problems due to limitations and disadvantages of the related art.

An object of the present invention is to provide a method of transmitting data is a wireless communication system.

Another object of the present invention is to provide a method of retransmitting data in a wireless communication system.

A further object of the present invention is to provide an apparatus for retransmitting data in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, [a method of transmitting data is a wireless communication system includes receiving a first group index and a second group index, wherein the first group index represents indices of a group having channel power below a specified threshold value and the second index group index represents indices of a group having channel power greater than or equal to the specified threshold value, and transmitting the data after swapping mapping locations of the first group index and the second group index.

In another aspect of the present invention, a method of retransmitting data in a wireless communication system includes measuring power values of a receiving channel in terms of subcarriers or subcarrier groups per each antenna, generating feedback information based on the measured power values, receiving the feedback information regarding channel information in terms of the subcarriers or the subcarrier groups for each transmit antenna, allocating the data to the subcarriers or the subcarrier groups, which were mapped to the subcarriers or the subcarriers groups having relative poor channel condition, to the subcarriers or the subcarrier groups having relative good channel condition, and retransmitting the data on the allocated subcarriers or the subcarrier groups via a plurality of antennas.

In a further aspect of the present invention, an apparatus for retransmitting data in a wireless communication system includes at least one encoder configured to attach error correction bits, at least one hybrid automatic request function module configured to perform at least one of retransmission and rate matching, at least one mapper configured to convert parallel signals into symbols, a resource allocation module configured to allocate the data to subcarriers, and an allocation controller configured to receive feedback information from a receiver, wherein the resource allocation module controls transmission by changing the subcarrier index, having large fading during initial transmission, with the subcarrier index having good channel condition.

Yet, in another aspect of the present invention, an apparatus for retransmitting data in a wireless communication system includes at least one fast Fourier transform (FFT) module configured to process the symbols transmitted from a transmitter, at least one demapper configured to convert the symbols into signals, an index selection module configured to measure receiving channel power of each subcarrier or each subcarrier group corresponding to each transmit antenna, and a storage unit configured to store at least one subcarrier index or at least one subcarrier group index, wherein the measured channel power is compared to a predetermined threshold value and the subcarrier index or the subcarrier group index whose value I is greater than or equal to the predetermined threshold value is stored in the storage unit.

It is to be understood that both the foregoing general description and the following detailed description of the present invention are exemplary and explanatory and are intended to provide further explanation of the invention as claimed.

DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
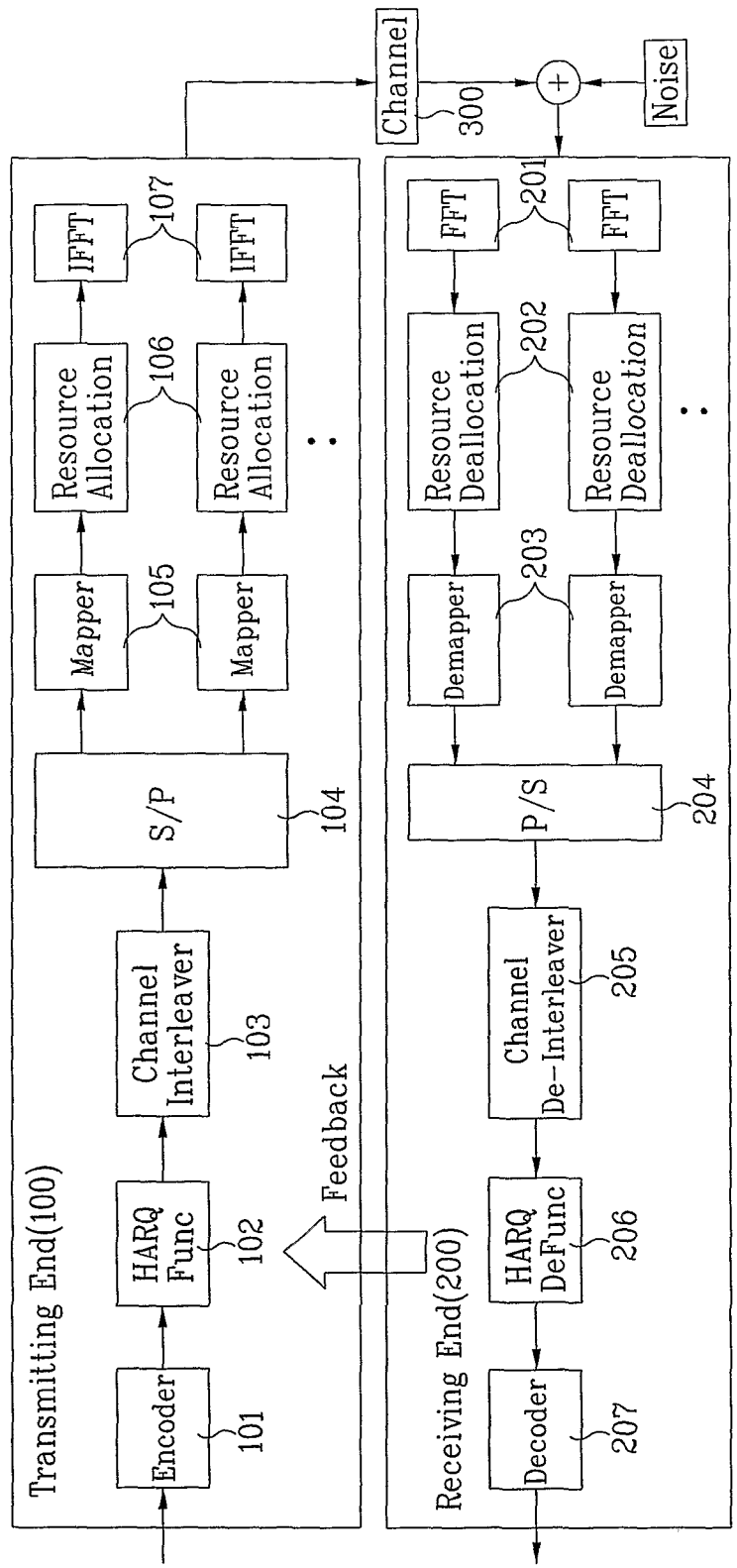
FIG. 1 is a diagram illustrating a transmitter and a receiver using a single codeword (SCW) scheme in an orthogonal frequency division multiplexing (OFDM) multi-antenna communication system.
Figure 2:
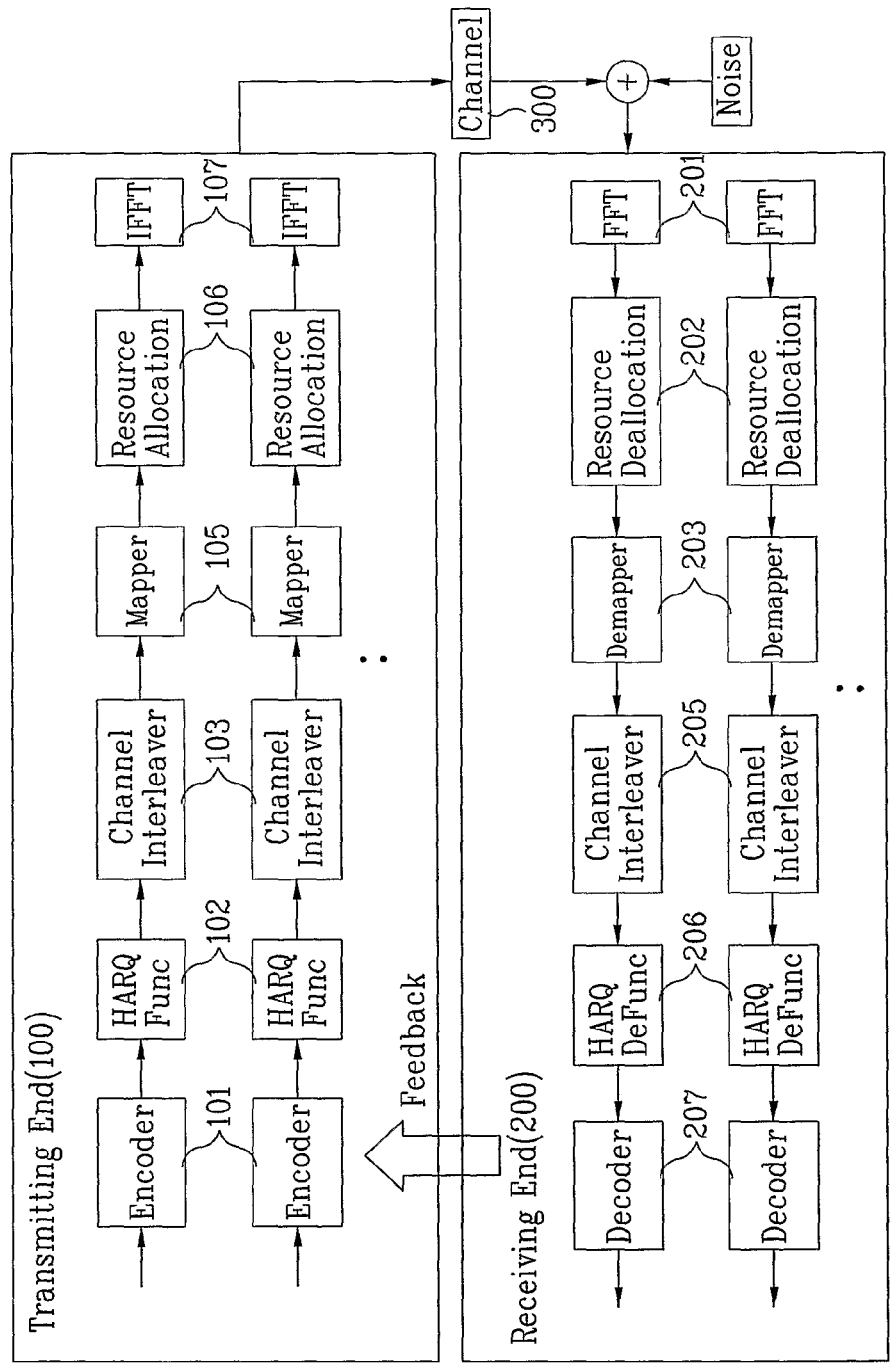
FIG. 2 is a diagram illustrating a transmitter and a receiver using a multiple codeword (MCW) scheme in an OFDM multi-antenna communication system.

FIG. 1 is a diagram illustrating a transmitter and a receiver using a single codeword (SCW) scheme in an orthogonal frequency division multiplexing (OFDM) multi-antenna communication system. FIG. 2 is a diagram illustrating a transmitter and a receiver using a multiple codeword (MCW) scheme in an OFDM multi-antenna communication system.

Referring to FIG. 1 and FIG. 2, the transmitter 100 of the OFDM multi-antenna communication system comprises an encoder 101, a module having hybrid automatic request (HARQ) function 102 (hereinafter referred to as "HARQ module"), a channel interleaver 103, a serial-to-parallel (S/P) converter 104, a mapper 105, a resource allocation module 106, and an inverse fast Fourier transform (IFFT) module 107.

More specifically, the encoder 101 is used to reduce noise and effect from the channel caused by a coding method in which extra bits are attached or inserted to the data bits. The HARQ module 102 is used to perform retransmission and/or rate-matching. Moreover, the channel interleaver 103 is used to shuffle the data bits, which includes the cyclic redundancy check (CRC), so as to spread the burst error in a channel. The S/P converter 104 is used to convert serially inputted signal into parallel signal.

Furthermore, the mapper 105 is used to convert the parallel signal (or bits) into symbols. The resource allocation module 106 is used to allocate (or map) the symbols to subcarriers, and the IFFT module 107 is used to modulate the allocated symbols to OFDM symbols and send the modulated OFDM symbols to channel 300.

The transmitter 100 shown in FIG. 1 uses the SCW scheme. Here, because a single codeword is used, the transmitter 100 includes only one of each encoder 101, HARQ module 102, and channel interleaver 103. In case of the transmitter 100 of FIG. 2, there are two (2) encoders 101, two (2) HARQ modules 102, and two (2) channel interleavers 103, based on two (2) codewords used.

With respect to the receiver 200 of FIG. 1 and FIG. 2, the receiver 200 includes a fast Fourier transform (FFT) module 201, a resource de-allocation module 202, a demapper 203, a parallel-to-serial (P/S) converter 204, a channel de-interleaver 205, a module having inverse HARQ function (hereinafter referred to as "HARQ-inverse module") 206, and a decoder 207. In operation, the receiver 200 receives the signal from the transmitter 100 and processes the signal in reverse order from those of the transmitter.

More specifically, the FFT module 201 and the resource de-allocation module 202 processes the data signals (or symbols) passed through the channel 300. Thereafter, the processed symbols are converted into bits by the demapper 203 and further processed through the P/S converter 204 and the de-interleaver 205. Then, the processed data bits are rate-matched for decoding purposes at the HARQ-inverse module 206 and processed through the decoder 207 from which the data is decoded.

After the data (or data packet) is decoded, possible error can be detected via the error detection code (e.g., CRC bits). If error is discovered with the decoded data packet, the receiver 200 sends a negative acknowledgement (NACK) signal to the transmitter 100. Conversely, if no error is discovered with the decoded data packet, the receiver 200 sends a positive acknowledgement (ACK) signal to the transmitter 100.

If the transmitter 100 receives the ACK signal, then no action is taken with respect to the previously transmitted data packet. However, if the transmitter 100 receives the NACK signal, then the transmitter 100 retransmits the data packet. The retransmission can take place according to the transmission schedule determined by a scheduler.

Figure 3:
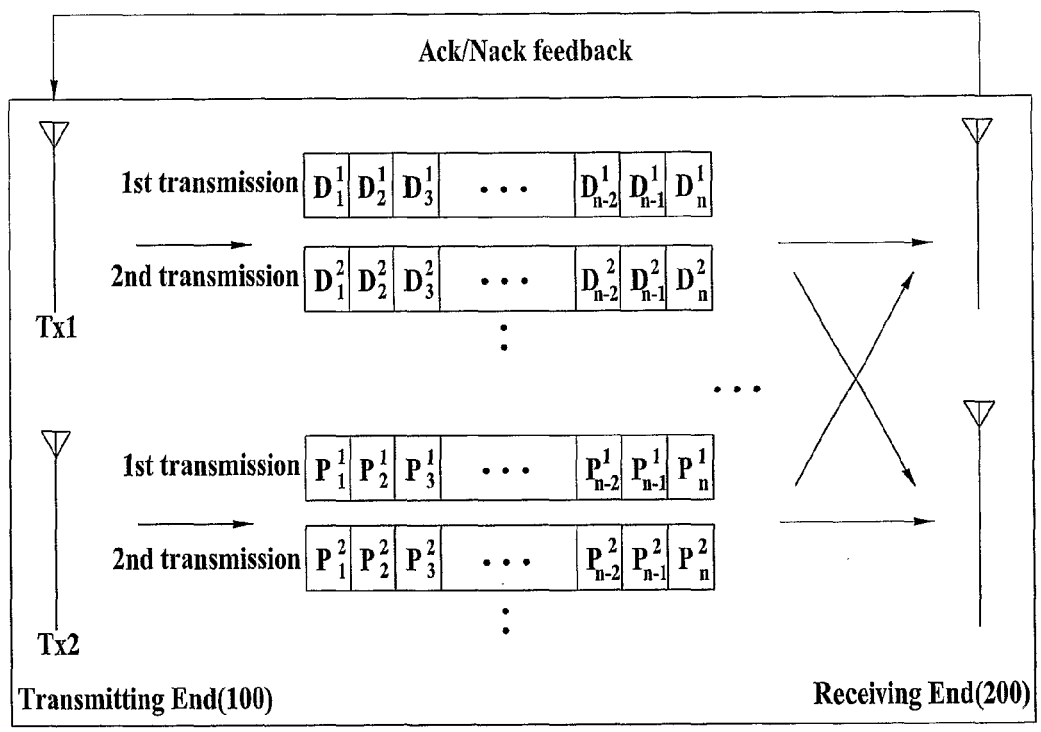
FIG. 3 illustrates a communication system having two (2) transmit antennas in which the resource allocation module allocates a first transmission of data and a second transmission of data via a same antenna.
Figure 4:
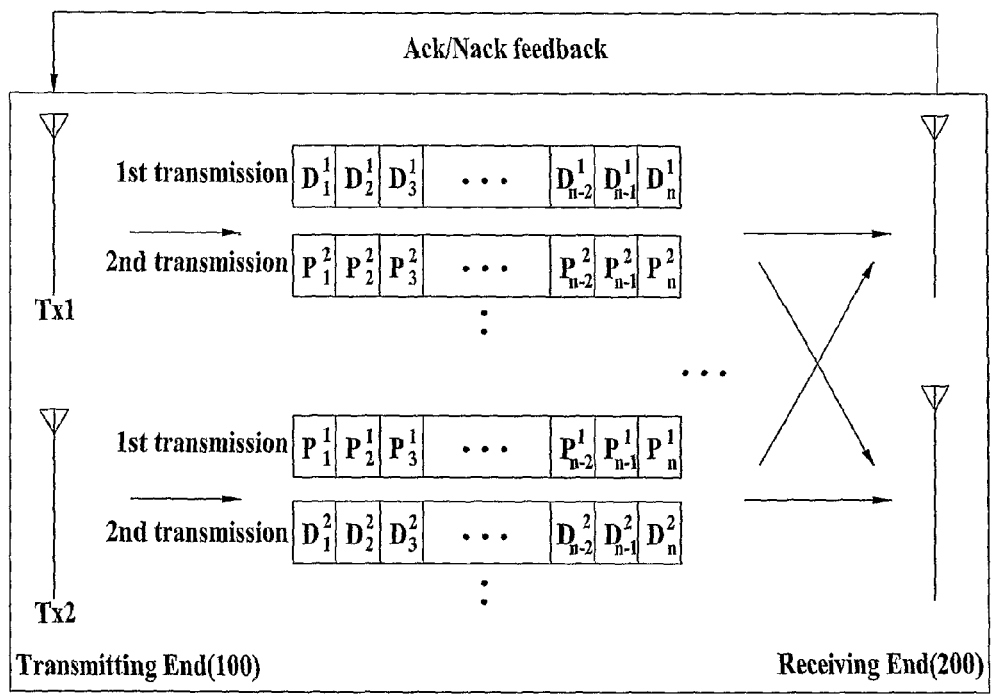
FIG. 4 illustrates a communication system having two (2) transmit antennas in which the resource allocation module allocates a first transmission of data and a second transmission of data via different antennas.

With respect to data (or data packet) retransmission, FIG. 3 and FIG. 4 describe in more detail the processes associated with retransmission in view of the resource allocation module 106.

FIG. 3 is a diagram illustrating retransmitting data from the resource allocation module by fixing the assigned transmit antennas. FIG. 4 is a diagram illustrating retransmitting data from the resource allocation module by changing the assigned transmit antennas.

More specifically, FIG. 3 illustrates a communication system (e.g., multi-input, multi-output (MIMO) system) having two (2) transmit antennas in which the resource allocation module allocates a first transmission of data and a second transmission of data via a same antenna. Alternatively, FIG. 4 illustrates a communication system having two (2) transmit antennas in which the resource allocation module allocates a first transmission of data and a second transmission of data via different antennas. Here, the transmission of data via different antennas can be accomplished by antenna permutation.

In an OFDM structure, each subcarrier can be transmitted in an environment having favorable channel condition or in an environment having large fading. Some of the subcarriers (or subcarrier bandwidth) experiencing large fading are the subcarriers which can bring down the entire system capability. In order to compensate for such a phenomenon, a channel coding scheme can be used. However, if the degree of fading is severe, then the channel coding scheme may not be enough.

As such, if an index of the antennas is shuffled for retransmission of data as shown in FIG. 4, a diversity gain can be achieved compared to the retransmission method as shown in FIG. 3. That is, if the first transmission of data experiences poor channel condition but the second transmission of data experiences good channel condition, then the poor channel condition is partially compensated by the good channel condition. In other words, deterioration of the communication system performance caused by large fading can be prevented and/or alleviated.

Despite the potential positive outcome, if the antenna index is arbitrarily shuffled, it is possible that a channel having poor condition (e.g., first transmission) may be changed to another channel having a poor channel condition (e.g., second transmission). Alternatively, the converse can be true. That is, the first transmission having a good channel condition may be changed with the second transmission also having a good channel condition. Such occurrences negate diversity gain.

Furthermore, it is possible that the transmitted data on each antenna via a specific subcarrier (or subcarrier bandwidth) can experience a very good or a very bad channel condition, it may be necessary for data allocation for retransmission to consider various channel environments.

Figure 5:
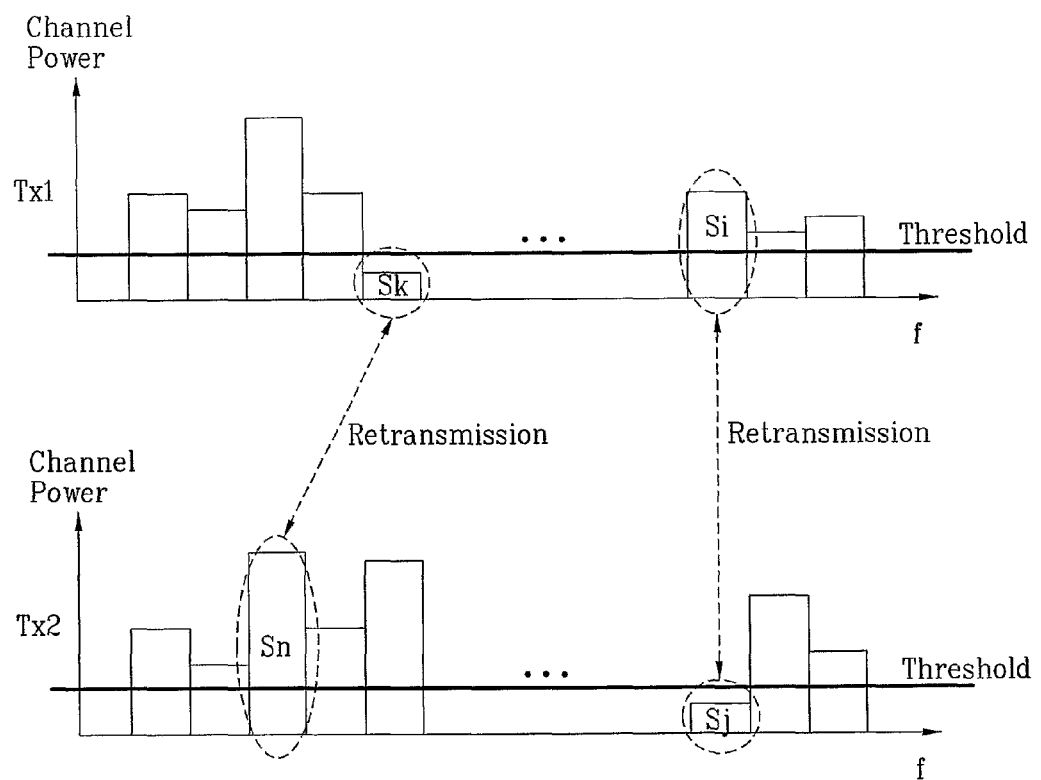
FIG. 5 is an exemplary diagram illustrating measuring the power of a receiving channel at a receiver and generating feedback information to control data retransmission.

FIG. 5 is an exemplary diagram illustrating measuring the power of a receiving channel at a receiver and generating feedback information to control data retransmission. More specifically, the receiver can measure the power of the receiving channel in terms of subcarriers per each antenna, and using the measured values, the feedback information can be generated.

Referring to FIG. 5, the receiver can measure the power of the channel per each subcarrier for each of the two (2) transmit antennas (e.g., Tx1 and Tx2). The measured power values can then be compared with a determined threshold value to determine index of the subcarriers experiencing large fading. In FIG. 5, the subcarriers or subcarrier bandwidth experiencing large fading is indicated by $S_k$ and $S_j$.

Here, the threshold value can be configured based on the severity or degree of fading. If the threshold value is configured to be a relative high value, the performance improvement may increase but the subcarrier bandwidth with large fading becomes smaller in relation. Therefore, the more feedback information needs to be transmitted. As such, the threshold value can be configured based on the degree of compensation for fading channel required by the system and the amount of feedback information.

In order to retransmit the data, transmitted via the subcarriers having large fading, via channels having good channel quality, the index of subcarrier bandwidth having channel power of the subcarrier bandwidth for each transmit antenna greater than the threshold value. As illustrated in FIG. 5, if there is a plurality of indices of the subcarrier bandwidth having channel power greater than the threshold value, the indices can be selected based on the largest channel power, and the number of selected indices can correspond to the number of subcarrier indices determined to experience large fading. Moreover, in FIG. 5, $S_n$ and $S_i$ denote subcarrier indices having good channel conditions.

According to an embodiment of the present invention, the feedback information can include the subcarrier index ($S_k$, $S_j$) having a poor receiving channel condition and the subcarrier index ($S_n$, $S_i$) having a good receiving channel condition. After receiving the feedback information, the transmitter can map (or allocate) the data transmitted via the subcarriers of $S_k$, $S_j$ to the subcarriers $S_n$, $S_i$ for retransmission of the data. With this, the system can experience less deterioration of performance.

Figure 6:
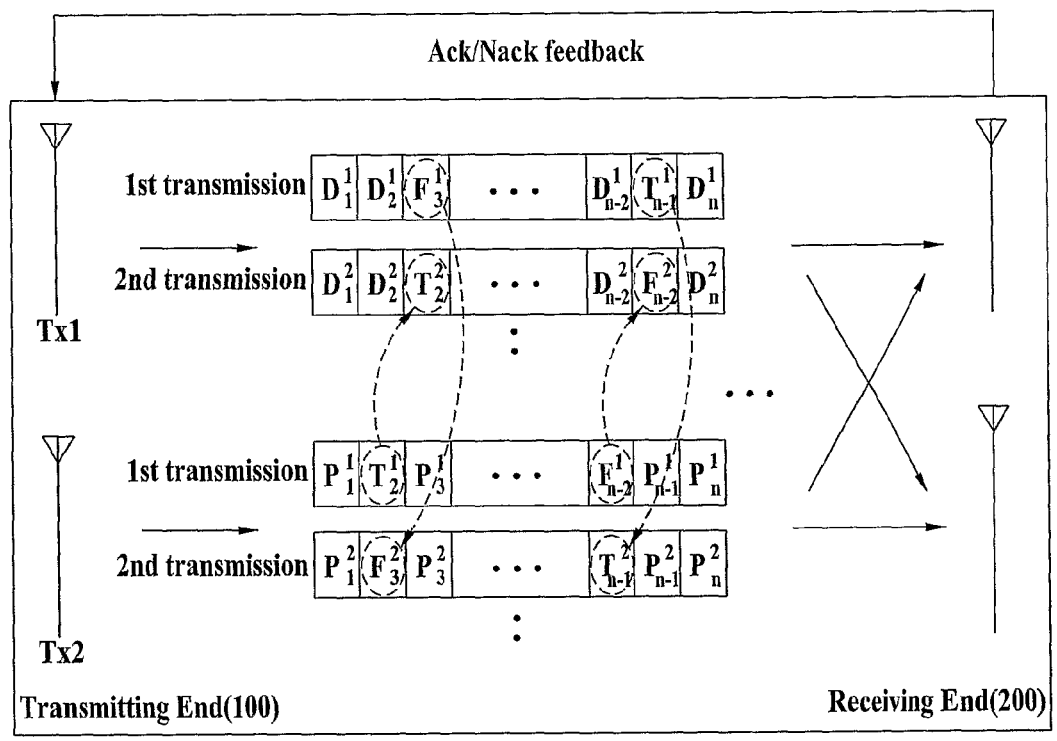
FIG. 6 is an exemplary diagram illustrating locations for allocation of data during retransmission according to an embodiment of the present invention.
Figure 7:
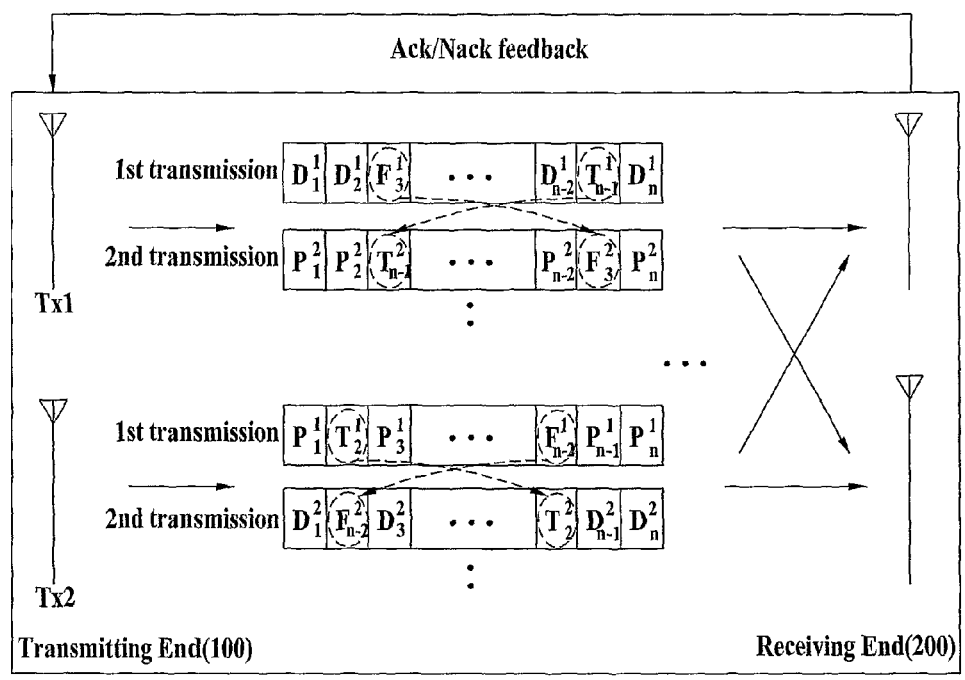
FIG. 7 is an exemplary diagram illustrating locations for allocation of data during retransmission according to another embodiment of the present invention.

FIG. 6 is an exemplary diagram illustrating locations for allocation of data during retransmission according to an embodiment of the present invention. FIG. 7 is an exemplary diagram illustrating locations for allocation of data during retransmission according to another embodiment of the present invention.

In detail, FIG. 6 is similar to FIG. 3 in that the transmit antennas are fixed (unchanged) for retransmission. Furthermore, in FIG. 6, the receiving channel information is received in terms of subcarriers for each transmit antenna. Thereafter, the data which were mapped to subcarriers having large fading (e.g., relative poor channel condition) is mapped (or reallocated) to the subcarriers having good channel condition. These subsequently mapped (or reallocated) data are then retransmitted on the subcarriers having good channel condition. Here, 'D' denotes data transmitted via the first antenna (Tx1) during initial transmission, 'P' denotes data transmitted via the second antenna (Tx2) during initial transmission, 'F' denotes subcarrier(s) having large fading based on the feedback information, and 'T' denotes subcarrier(s) having a good channel condition.

As illustrated in FIG. 6, with respect to mapping subcarriers, the locations of (T, F) are changed during retransmission. Therefore, if the initial transmission was affected by large channel fading, the retransmission can compensate for the poor channel condition by changing the locations of the subcarriers during retransmission.

FIG. 7 is similar to FIG. 4 in that the transmit antennas can change for retransmission. Furthermore, in FIG. 7, the receiving channel information is received in terms of subcarriers of each transmit antenna. Thereafter, the data mapped to subcarriers having large fading is retransmitted after being mapped (or reallocated) to subcarriers having good channel condition. The symbols (e.g., D, P, F, and T) are the same as those from FIG. 6.

The resource allocation module of the transmitter can change the locations of (T, F) with respect to subcarrier mapping during data retransmission. Here, the subcarrier index can be the subcarrier index of a same transmit antenna or can be the subcarrier index of a different transmit antenna.

According to the mapping schemes of FIGS. 6 and 7, as discussed, the transmission of data can be compensated during retransmission since the data transmitted via subcarriers with large channel fading is retransmitted via subcarriers having a good channel condition. As a result, the system performance is as a whole can improve.

Referring to FIG. 5-7, the receiving channel power of each subcarrier of each antenna can be measured and based on this measurement, the data mapping index can be changed during retransmission. Here, the channel power measurement and/or data mapping does not have to be limited to subcarriers and can be applied to a group of subcarriers or a plurality of subcarriers.

Figure 8:
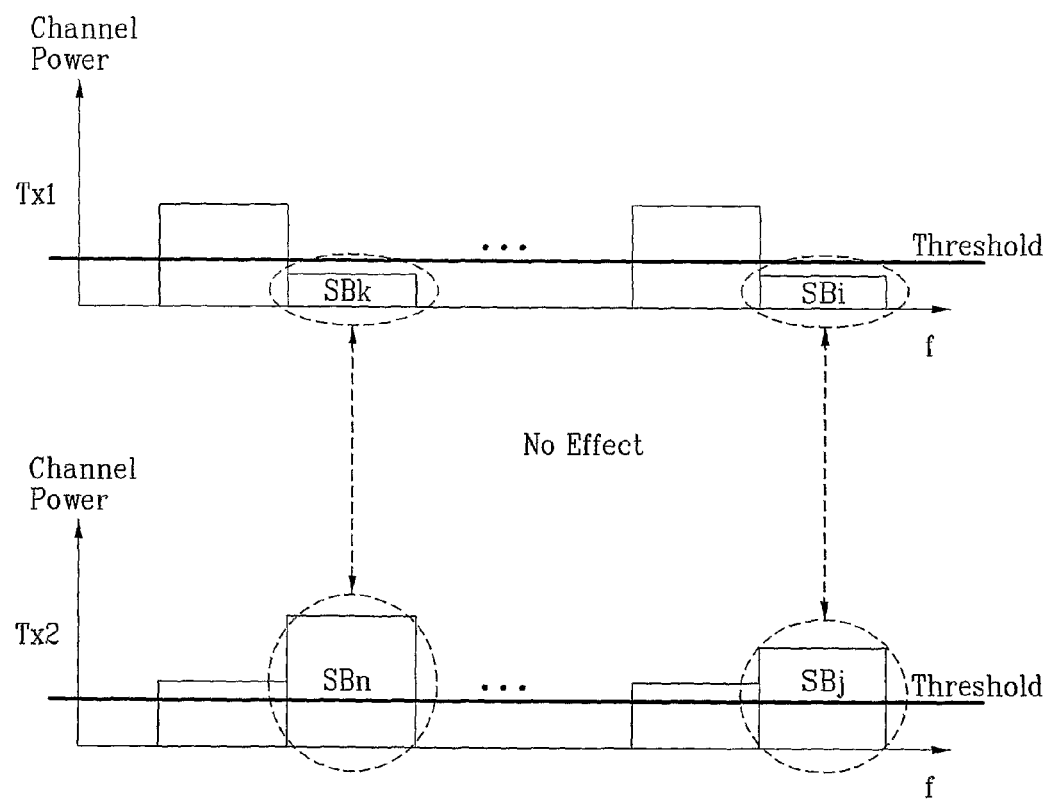
FIG. 8 is an exemplary diagram illustrating generating feedback information based on a specified number of groups of subcarriers for retransmission.

FIG. 8 is an exemplary diagram illustrating generating feedback information based on a specified number of groups of subcarriers for retransmission. In FIG. 8, a group of subcarriers (hereinafter referred to as a "subcarrier group or subcarrier block (SB)") can be the basis for determining the channel power and changing the data allocation location.

As discussed, the method of generating the feedback information using the determined receiving channel power and changing the locations of the data (e.g., allocation re-mapping) during retransmission can also be applied to the SB. In other words, the SB can be also used in a same manner as the subcarriers. For example, each symbol of the index (T, F) can represent group(s) of subcarriers.

As applied to the SB, the channel power of the SB can be the average power of the subcarriers in each group. Furthermore, an additional threshold value can be applied based on the degree (or severity) of fading so as to provide weight to specific subcarrier when determining the average of the channel power within the SB. Even though the amount of calculation may increase, the average channel power can be more realistic.

Referring to FIG. 8, $SB_k$, $SB_i$ can be used to indicated an index of the SB (or SB index) which experiences large fading, and $SB_n$, $SB_j$ can be used to indicate the SB index having a good channel condition. These indices can be stored and transmitted as feedback information to the transmitter. At the transmitter, during retransmission, the indices ($SB_k$, $SB_i$), ($SB_n$, $SB_j$) can be changed and the data can be remapped using the changed indices.

If the SB is applied as is the case in FIG. 8, improvement to the system performance may be relatively smaller than the improvement of FIG. 5. However, the amount of calculation and/or amount of feedback information can be reduced.

In other words, if the feedback information is generated after measuring the received channel power in terms of subcarriers, as illustrated in FIG. 5, the amount of data (or indices) stored as the feedback information equals the number of the transmit antennas and the number of the subcarriers of each transmit antenna. Here, the stored data (or indices) can be stored in form of an array. However, it is not necessary to store all of the data. Instead, the amount of data (or a number of indices) that corresponds to the indices of the subcarriers having channel power below a certain threshold can be stored.

As illustrated in FIG. 8, if the feedback information is generated after measuring the received channel power in terms of a specified number of subcarrier groups or SB, the amount of data (or a number of available arrays) may be reduced according to the number of subcarriers in the subcarrier groups. At the same time, the number of indices experiencing large fading, as a result of having channel power below a predetermined threshold, can also be reduced. Here, however, the level of improvement of system performance may not be as great compared to when the channel condition of each subcarrier was contemplated. In particular, in a relatively unstable channel condition environment, differences in channel power of each subcarrier may be large, and as a result, it may be difficult to group the subcarriers (or difficult to apply the SB). However, in an environment where the differences in channel power are small, it may unnecessary to group the subcarriers (or apply SB).

In an embodiment of the present invention, the level (or degree) of correlation between the subcarriers were measured, and based on the value of correlation, further determinations were made. For example, if the correlation value is large, determination is made that there is small channel variation per each subcarrier. Based on this determination, the feedback information is generated retransmitted in terms of SB (or subcarrier group), as shown in FIG. 8. Alternatively, if the correlation value is small, determination is made that there is large channel variation per each subcarrier, and based on this determination, the feedback information is generated and transmitted in terms of subcarriers, as shown in FIG. 5.

Further, the amount of change in channel power according to user's (or terminal's) mobility can be expressed as shown in Equation 1. The embodiment of the present invention applies to various situations with respect to the user's or terminal's level of mobility. That is, the user's mobility can refer to the speed at which the user is moving and/or the amount of movement. The embodiments of above can be applied, but not limited to, situations where the user's mobility is small or moderate (i.e., not much change in channel condition during retransmission). As such, it may be necessary to compensate for this when the user's mobility is high.

$$|\Xi_n|^2=(1-|\rho|^2)\sigma_h^2 \qquad \text{[Equation 1]}$$

Here, $|\Xi_n|^2$ denotes the amount of change in channel power according to the user's mobility, $\sigma_h^2$ denotes average energy of the channel, and $\rho$ denotes a variable acquired by using Bessel function with respect to Doppler frequency and time delay in time-varying channel environment. ρ p can be further expressed as shown in Equation 2.

$$\rho=J_0(2\pi f_d \tau_d) \qquad \text{[Equation 2]}$$

Here, $J_0$ (•) denotes Bessel function, $f_d$ denotes Doppler frequency, and $\tau_d$ denotes time delay. According to Equation 2, ρ is inversely proportional to user's mobility in that ρ decreases with increase in the user's mobility, and conversely, ρ increases with decrease in user's mobility. For example, ρ=1 denotes complete (or perfect) channel information.

In addition, the receiving channel power can be compensated by using the amount of channel power. This can be expressed as shown in Equation 3.

$$|\overline{H}_n|^2=|H_n|^2+|\Xi_n|^2 \qquad \text{[Equation 3]}$$

Here, $|H_n|^2$ denotes a receiving channel power of the nth subcarrier, and $|\overline{H}_n|^2$ denotes a channel power value compensated by the amount of channel power change according to the user's mobility.

As another embodiment of the present invention, the aforementioned scheme or equations of above can be applied in situations where the user's mobility is high (or fast).

Figure 9:
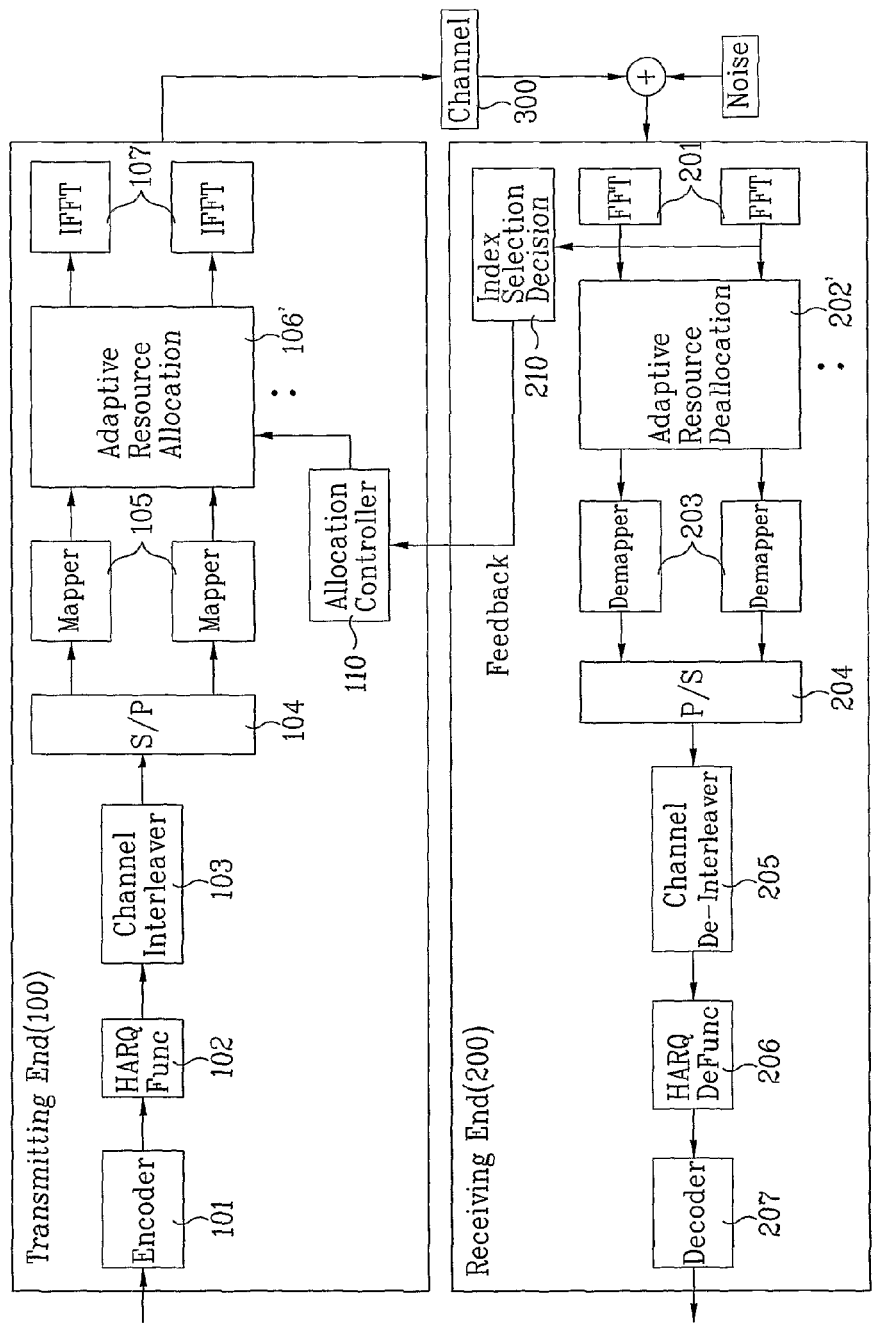
FIG. 9 is an exemplary structural diagram illustrating a transmitting end and a receiving end using a SCW scheme.
Figure 10:
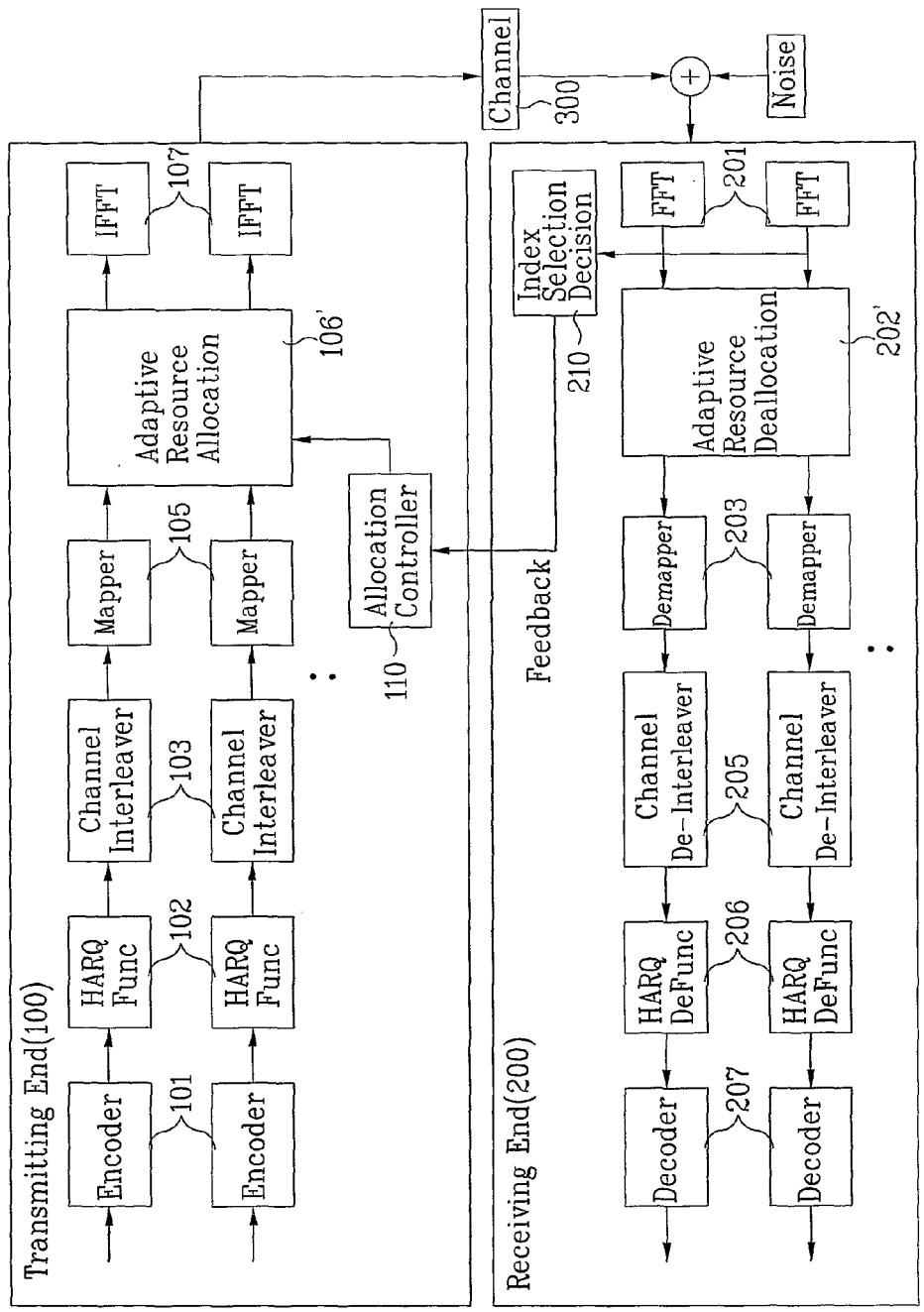
FIG. 10 is an exemplary structural diagram illustrating a transmitting end and a receiving end using a MCW scheme.

FIG. 9 is an exemplary structural diagram illustrating a transmitting end and a receiving end using a SCW scheme. FIG. 10 is an exemplary structural diagram illustrating a transmitting end and a receiving end using a MCW scheme. The fundamental structures of the transmitting ends and the receiving ends of FIGS. 9 and 10 are the same as those of FIGS. 1 and 2. However, the difference is that in the receiving 200 of FIGS. 9 and 10, the receiving channel power can be measured in terms of per each subcarrier or per subcarrier group. In addition, an index selection module 210 is added for generating the feedback information based on an index having large fading and an index that can be compensated and used for retransmission.

More specifically, the index selection module 210 can include a receiving channel measurement unit (not shown) configured to measure receiving channel power of each subcarrier or of each subcarrier group corresponding to each transmit antenna. The measured channel power value can be compared to a predetermined threshold value, and the subcarrier index or the subcarrier group index having large fading can be stored. The module can then further include a buffer (not shown) to store the subcarrier index or the subcarrier group index that are greater than the predetermined threshold. Lastly, the feedback information can be generated based on the determination by the index selection module 210 and send the generated feedback information to the transmitting end 100.

As for the transmitting end 100, an allocation controller 110 is added to control the resource allocation module 106' during retransmission. More specifically, the allocation controller 110 can be configured to receive the feedback information from the receiving end 200. During retransmission, the resource allocation module 106' can control transmission by changing the subcarrier index, having large fading during initial transmission, with the subcarrier index having good channel condition.

The structures as illustrated in FIGS. 9 and 10 are merely examples and as such, the structures can be configured differently.

Figure 11:
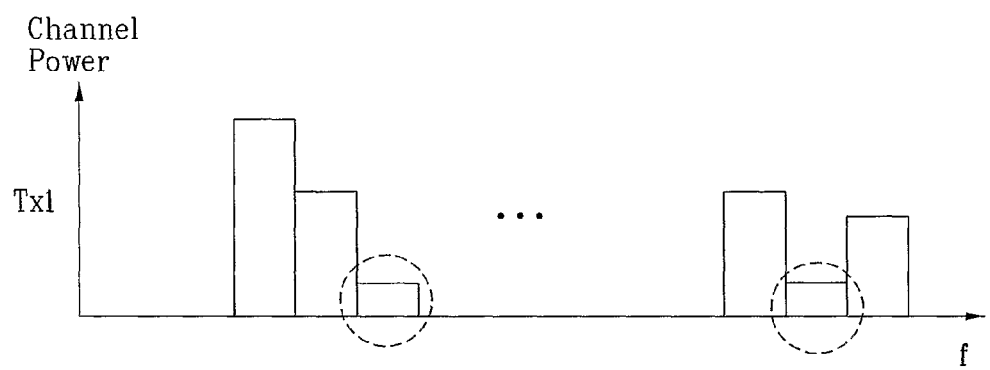
FIG. 11 is an exemplary diagram illustrating comparison of retransmission method according to the embodiment of the present invention to the conventional retransmission method.
Figure 11:
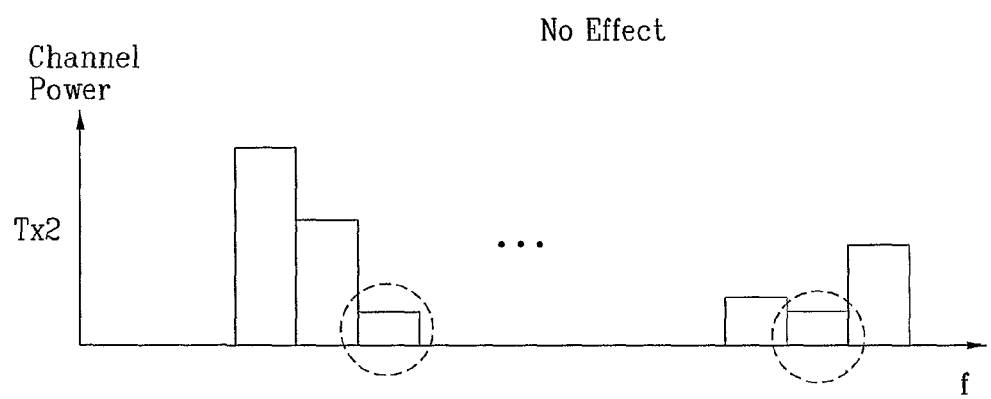
Figure 12:
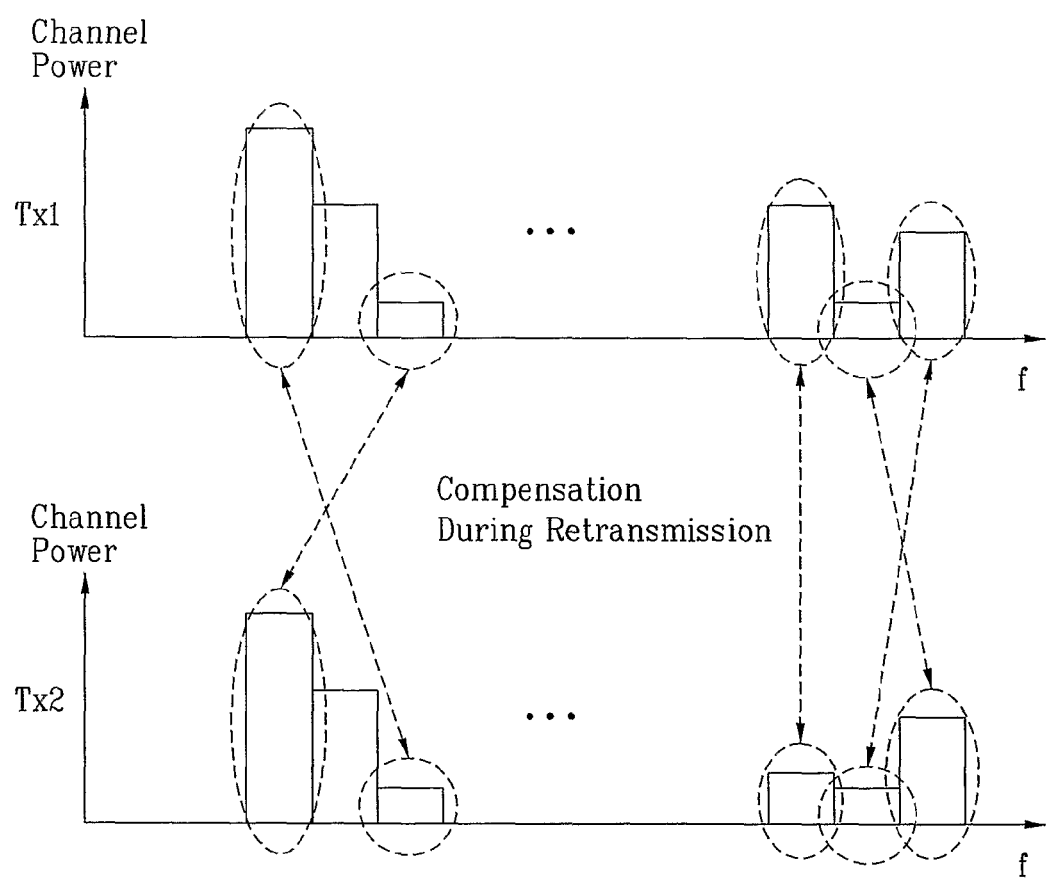
FIG. 12 illustrates retransmission of data according to at least one of the embodiments of the present invention.

FIGS. 11 and 12 are exemplary diagrams illustrating comparison of retransmission methods according to the embodiments of the present invention to the conventional retransmission methods.

FIG. 11 illustrates the conventional retransmission. More specifically, data is transmitted via two transmit antennas (e.g., Tx1 and Tx2). If the subcarrier bandwidth experiencing large fading are the same (illustrated in dotted circles) for each transmit antenna, there is no compensation for data loss except for the possible gain achieved by retransmission itself, even when the retransmission are made via different antenna or by a fixed antenna.

However, FIG. 12 illustrates retransmission of data according to at least one of the embodiments of the present invention. Here, the retransmission is made by changing or reassigning the subcarrier bandwidth. More specifically, the data assigned to the subcarrier bandwidth which experienced large fading during initial transmission is reassigned to the subcarrier bandwidth having good channels so that the data can be retransmitted under more favorable and reliable conditions. As illustrated in FIG. 12, with this arrangement, retransmission can compensate for poor initial channel condition and thus, provides more reliable retransmission.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting data in a wireless communication system, the method comprising:
    receiving, at a transmitter, a feedback comprising a first group index and a second group index, wherein the first group index represents indices of a subcarrier group having channel power below a specified threshold value and the second group index represents indices of a subcarrier group having channel power greater than or equal to the specified threshold value; and
    transmitting remapped data to a receiver, after swapping mapping locations between the subcarrier group associated with the first group index and the subcarrier group associated with the second group index,
    wherein a channel fading is controlled by the swapping of the mapping locations between the subcarrier group associated with the first group index and the subcarrier group associated with the second group index, in accordance with a number of swapped mapping locations, and
    wherein the channel power is compensated in accordance with the following equation:

$|\overline{H}_n|^2 = |H_n|^2 + |\Xi_n|^2$, where $|H_n|^2$ denotes a receiving channel power of an $n^{th}$ subcarrier, $|\Xi_n|^2$ denotes an amount of change in channel power according to the receiver's mobility, and $|\overline{H}_n|^2$ denotes a channel power value compensated by the amount of change in channel power.

2. The method of claim 1, wherein the specified threshold value is configured based on a predetermined level of channel fading.

3. The method of claim 1, wherein the remapped data is transmitted via a different antenna than an antenna used prior to the swapping.

4. The method of claim 3, wherein a number of subcarriers in the subcarrier group associated with the first group index and the subcarrier group associated with the second group index corresponds to a correlation value for each of the subcarriers in the number of subcarriers.

5. The method of claim 1, wherein the subcarrier group associated with the first group index and the subcarrier group associated with the second group index are respectively stored in a storage unit as data arrays.

6. A method of retransmitting data in a wireless communication system, the method comprising:
    measuring, at a receiver, power values associated with a receiving channel, in terms of subcarriers or subcarrier groups per antenna of a transmitter;
    generating, at the receiver, feedback information based on the measured power values associated with the subcarrier or subcarrier groups;
    transmitting, by the receiver, the generated feedback information to the transmitter;
    allocating, at the transmitter, remapped data for the receiving channel by mapping data from subcarriers or subcarrier groups having a poor channel condition, to subcarriers or subcarrier groups having a good channel condition; and
    transmitting, at the transmitter, the remapped data allocated to the subcarriers or the subcarrier groups of the receiving channel to the receiver,
    wherein a channel fading is controlled based on an amount of the remapped data allocated to the subcarrier or subcarrier groups having a good channel condition, from the subcarriers or subcarrier groups having a poor channel condition, and
    wherein the measured power values are compensated in accordance with the following equation:

$|\overline{H}_n|^2 = |H_n|^2 + |\Xi_n|^2$, where $|H_n|^2$ denotes a receiving channel power of an $n^{th}$ subcarrier, $|\Xi_n|^2$ denotes an amount of change in channel power according to the receiver's mobility, and $|\overline{H}_n|^2$ denotes a channel power value compensated by the amount of change in channel power.

7. The method of claim 6, further comprising determining subcarriers or subcarrier groups experiencing a poor channel condition by comparing the measured power values associated with the received channel data with a specified threshold value at the receiver.

8. The method of claim 7, wherein the specified threshold value is determined based on a predetermined level of channel fading.

9. The method of claim 6, wherein a plurality of antennas of the transmitter are fixed for retransmission.

10. The method of claim 6, wherein a subcarrier group among the subcarrier groups comprises a plurality of subcarriers.

11. The method of claim 6, wherein a measured power value associated with at least one subcarrier group of the received channel data represents an average power of subcarriers in the at least one subcarrier group.

12. The method of claim 6, wherein if an amount of movement by the receiver is determined to be substantially high, the measured power values are compensated according to the following equation:

$|\Xi_n|^2 = (1 - |\rho|^2)\sigma_h^2$, where $\sigma_h^2$ denotes an average energy of the receiving channel, and $\rho$ denotes a variable acquired by using a Bessel function with respect to a Doppler frequency and a time delay in a time-varying channel environment.

13. The method of claim 12, wherein ρ is further expressed by the following equation:

$$\rho = J_0(2\pi f_d \tau_d)$$

where $J_0(\cdot)$ denotes a Bessel function, $f_d$ denotes a Doppler frequency, and $\tau_d$ denotes a time delay; and where ρ is inversely proportional to the receiver's mobility, such that ρ decreases with an increase in the receiver's mobility, and conversely, ρ increases with a decrease in the receiver's mobility.

14. An apparatus for retransmitting data in a wireless communication system, the apparatus comprising:
   at least one encoder configured to attach error correction bits to a transmitted data;
   at least one hybrid automatic request function module configured to perform at least one of data retransmission and rate matching;
   at least one mapper configured to convert parallel signals into symbols;
   a resource allocation module configured to allocate mapped data to subcarriers; and
   an allocation controller configured to receive feedback information from a receiver,
   wherein the resource allocation module is further configured to control a remapping of data by swapping mapping locations of subcarriers or subcarrier groups having a poor channel condition, to subcarriers or subcarrier groups having a good channel condition in accordance with at least one subcarrier index or at least one subcarrier group index included in the feedback information,
   wherein a channel fading is controlled by the resource allocation module remapping data from the subcarriers or subcarrier groups having a poor channel condition to subcarriers or subcarrier groups having a good channel condition, in accordance with a number of swapped mapping locations,
   wherein the feedback information is generated based on a measured power value of a receiving channel by the receiver, and
   wherein the measured power value is compensated in accordance with the following equation:

$$|\overline{H}_n|^2 = |H_n|^2 + |\Xi_n|^2,$$

where $|H_n|^2$ denotes a receiving channel power of an $n^{th}$ subcarrier, $|\Xi_n|^2$ denotes an amount of change in channel power according to the receiver's mobility, and $|\overline{H}_n|^2$ denotes a channel power value compensated by the amount of change in channel power.

15. An apparatus for transmitting data in a wireless communication system, the apparatus comprising:
   at least one fast Fourier transform (FFT) module configured to process symbols received from a transmitter;
   at least one demapper configured to convert the symbols into signals;
   an index selection module configured to measure a channel power of each subcarrier or each subcarrier group of a receiving channel per transmit antenna of a transmitter, and to select a corresponding subcarrier index or subcarrier group index for each subcarrier or each subcarrier group of the receiving channel; and
   a storage unit configured to store the selected subcarrier index or the selected subcarrier group index for each subcarrier or each subcarrier group of the receiving channel,
   wherein the measured channel power of each subcarrier or each subcarrier group is compared to a predetermined threshold value,
   wherein when a subcarrier or a subcarrier group whose measured channel power is determined to be greater than or equal to the predetermined threshold value is identified, the corresponding selected subcarrier index or subcarrier group index is stored in the storage unit,
   wherein when a subcarrier or a subcarrier group whose measured channel power is determined to less than the predetermined threshold value is identified, the corresponding selected subcarrier index or subcarrier group index is stored in the storage unit, and
   wherein the measured channel power is compensated in accordance with the following equation:

$$|\overline{H}_n|^2 = |H_n|^2 + |\Xi_n|^2,$$

where $|H_n|^2$ denotes a receiving channel power of an $n^{th}$ subcarrier, $|\Xi_n|^2$ denotes an amount of change in channel power according to the receiver's mobility, and $|\overline{H}_n|^2$ denotes a channel power value compensated by the amount of change in channel power.

16. The apparatus of claim 15, further comprising:
a transmitting unit configured to transmit a feedback comprising the selected subcarrier index or the selected subcarrier group index in the storage unit, to the transmitter.

* * * * *